United States Patent [19]

Inoue

[11] Patent Number: 4,510,366
[45] Date of Patent: Apr. 9, 1985

[54] FLUID DELIVERY RATE CONTROL TW ELECTRICAL MACHINING METHOD AND APPARATUS

[75] Inventor: Kiyoshi Inoue, Tokyo, Japan

[73] Assignee: Inoue-Japax Research Incorporated, Yokohama, Japan

[21] Appl. No.: 403,708

[22] Filed: Jul. 30, 1982

[30] Foreign Application Priority Data

Jul. 31, 1981 [JP] Japan ................... 56-121198

[51] Int. Cl.³ .............................................. B23P 1/08
[52] U.S. Cl. ................... 219/69 M; 219/69 W; 219/69 D
[58] Field of Search ............ 219/69 M, 69 D, 69 W, 219/69 R, 68, 69 S

[56] References Cited

U.S. PATENT DOCUMENTS

| 4,292,491 | 9/1981 | Tanaka et al. | 219/69 W |
| 4,317,019 | 2/1982 | Itoh | 219/69 D |
| 4,329,558 | 5/1982 | Martin | 219/69 W |

FOREIGN PATENT DOCUMENTS

| 2155068 | 10/1982 | Fed. Rep. of Germany. | |
| 2948498 | 11/1982 | Fed. Rep. of Germany. | |
| 31512 | 3/1980 | Japan | 219/69 W |

Primary Examiner—M. H. Paschall
Attorney, Agent, or Firm—Karl F. Ross; Herbert Dubno

[57] ABSTRACT

A method of and an apparatus for electrical-machining a conductive workpiece with an axially traveling wire electrode displaced transversely to the workpiece along a predetermined cutting path to advance electroerosion effected across the machining gap supplied with a machining liquid, wherein the rate of supply of the machining liquid to the gap is controlled as a function of the shape of the cutting path.

12 Claims, 4 Drawing Figures

FLUID DELIVERY RATE CONTROL TW ELECTRICAL MACHINING METHOD AND APPARATUS

FIELD OF THE INVENTION

The present invention relates generally to traveling-wire electrical machining and, more particularly, to a new and improved method of and apparatus for electroerosively machining a workpiece with a wire electrode fed from a supply side to a takeup side through a machining zone defined between the traveling wire electrode and the workpiece flooded with a machining liquid. The term "wire electrode" is used herein to refer to an electrical machining electrode in the form of a wire, tape, ribbon or like thin, elongate body.

BACKGROUND OF THE INVENTION

In electrical machining of this type, of which a most typical form utilizing a succession of electroereosive electrical discharges is commonly called "traveling-wire EDM" or "wire-cut EDM", the wire electrode is continuously advanced from a supply side, e.g. in the form of a wire-storage reel, to a takeup side, e.g. in the form of a wire-takeup reel, through a machining zone in which the workpiece is positioned. The machining zone is flushed with a machining liquid, typically distilled water or a liquid dielectric (in electrical discharge machining or EDM) or a liquid electrolyte (in electrochemical machining or ECM), or a weakly conductive liquid electrolyte (in electrochemical-discharge machining or ECDM). The workpiece is juxtaposed with the axially traveling wire across the machining zone between a pair of guide members which serve to stretch the traveling wire for positioning it precisely in a predetermined machining relationship with the workpiece. A series of electrical pulses are applied across a machining gap formed between the workpiece and the traveling wire electrode to effect time-spaced electrical discharge thereat to electroerosively remove material from the workpiece in the typical EDM mode of wire-cutting process. In the ECDM mode of wire-cutting process, electrolytic material solubilization is also utilized in addition to EDM action. The ECM mode of operation utilizes a purely electrolytic action for the workpiece material removal process and may make use of a continuous DC current.

As material removal proceeds, the workpiece is displaced relative to and transversely to the continuously traveling wire electrode, typically under numerical control, along a predetermined path to generate a desired pattern of cut in the workpiece. The continuous advancement or travel of the wire is effected typically by traction drive rollers disposed at a location between the guide member on the downstream side and the wire takeup means. A desired tension is established in the traveling wire typically by providing brake rollers at a location between the guide member on the upstream side and the wire supply means.

It is known that the achievement of a satisfactory machining accuracy requires the use of a wire electrode as thin as 0.05 to 0.5 mm in diameter. The machining liquid is supplied to the machining gap to serve as an electrical machining medium, to carry away the machined products and simultaneously to cool the thin electrode and the workpiece.

The present invention is based upon the recognition that in the traveling-wire electroerosive process with these unique characteristics, machining instability is created from time to time. It has now been recognized that machining instability is brought about as a function of the shape of the cutting path and especially in the region of turning points in the path traveled by the wire electrode. When machining becomes unstable, machining discharges tend to shift into an arc discharge or short-circuiting type electrical current passage, resulting in excessive heating of the wire electrode and consequently the breakage of the wire electrode and a reduced machining accuracy and efficiency.

OBJECTS OF THE INVENTION

Accordingly, the present invention seeks to provide an improved traveling-wire electroerosive machining method and apparatus whereby stabilized machining continuation is assured.

The present invention also seeks to provide a method and apparatus of the type described whereby the machining products are carried away from the machining zone consistently throughout a given machining operation involving a cutting path having successive sections intersecting at an angle.

SUMMARY OF THE INVENTION

In accordance with the present invention, in a first aspect thereof, there is provided a method of electrical-machining an electrically conductive workpiece wherein a continuous wire-electrode is axially transported from a supply side to a takeup side to continuously traverse the workpiece while defining a machining gap therewith supplied with a machining liquid; an electrical machining current is passed through the liquid flooded machining gap between the traveling wire electrode and the workpiece to electroerosively remove material from the latter; and the workpiece and the traveling wire electrode are relatively displaced transversely to the axis of the wire electrode along a predetermined cutting path corresponding to a desired contour to be formed in the workpiece, which method comprises controlling the rate of supply of the machining liquid as a function of the shape of the cutting path.

In accordance with a specific feature of the invention, the rate of supply of the machining liquid is increased selectively when the axis of the wire electrode approaches, arrives at and/or passes through a turning point between successive sections in the cutting path. Thus, the supply rate may be increased at least immediately prior to arrival of the axis of the wire electrode at a turning point. Alternatively, the supply rate may be increased at least subsequent to passage by the axis of wire electrode through a turning point. Generally, the supply rate should be controlled as a function of the curvature of the cutting path. To this end, the instantaneous curvature of the cutting path is sensed and the supply rate is controlled in response to the sensed curvature. It has been found to be desirable that the supply rate be increased in response to the sensed curvature exceeding a predetermined value.

Practically, the machining liquid may be supplied from a reservoir by a pump having a rotor driven by a motor. It is advantageous to control the rate of rotation of the motor to control the rate of supply of the machining liquid into the machining gap.

The invention also provides, in a second aspect thereof, an apparatus for electrically-machining an electrically conductive workpiece with a continuous wire electrode axially transported continuously from a supply side to a takeup side while continuously traversing the workpiece and defining a machining gap between the workpiece and the traveling wire electrode, which apparatus comprises: means for supplying a machining liquid into the machining gap; power supply means for passing an electrical machining current between the workpiece and the wire electrode through the liquid flooded machining gap to electroerosively remove material from the workpiece; machining feed means for relatively displacing the workpiece and the wire electrode transversely to the axis of the wire electrode along a prescribed cutting path corresponding to a desired contour to be formed in the workpiece; and means for controlling the rate of supply of the machining liquid into the machining gap as a function of the shape of the cutting path.

Means is advantageously provided which is operatively associated with the machining feed means for providing a sensing signal representing the shape of the cutting path to act on the control means for controlling the rate of supply of the machining liquid into the machining gap.

The control means may be operable selectively to respond to the sensing signal indicating arrival and/or passage by the axis of the wire electrode in a region of an intersection between successive sections in the path. The control means may be responsive to the sensing signal for increasing the rate of supply in volume of the machining liquid into the machining gap.

Advantageously, the control means includes a pump having a rotor for drawing the machining liquid into the machining gap from a reservoir, a motor for driving the rotor and a driver circuit for the motor, the driver circuit being responsive to the sensing means for increasing the rate of rotation of the motor selectively in response to the sensing signal for controlling the rate of supply in volume of the machining liquid into the machining gap.

BRIEF DESCRIPTION OF THE DRAWING

These and other features of the present invention as well as advantages thereof will become more readily apparent from a reading of the following description when taken with reference to the accompanying drawing in which.

SPECIFIC DESCRIPTION

Figure 1:
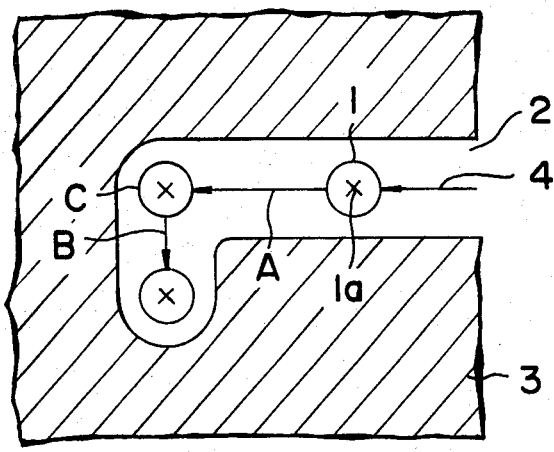
FIG. 1 is a schematic illustration diagrammatically representing the electroerosive machining of a workpiece with a traveling wire electrode.

FIG. 1 shows is a schematic view taken from above illustrating a wire electrode 1 producing a cut 2 in a workpiece 3 taken from above, in a plane perpendicular to the axis 1a of the wire electrode 1 which is caused to move relative to the workpiece 3 along a predetermined cutting trajectory or path 4 dictated by preprogrammed NC (numerical control) commands. The cutting path 4 is shown including two sections A and B which are rectilinear and interconnected by a section or point C with an angularity. In the region of the turning point or section C, it has been found that machining discharges produced between the wire electrode 1 and the workpiece 3 tend to become arcing or short-circuiting type discharges. As a result, a portion of the traveling wire electrode is heated up excessively and tends to be broken. This problem is effectively overcome in accordance with the present invention.

Figure 2:
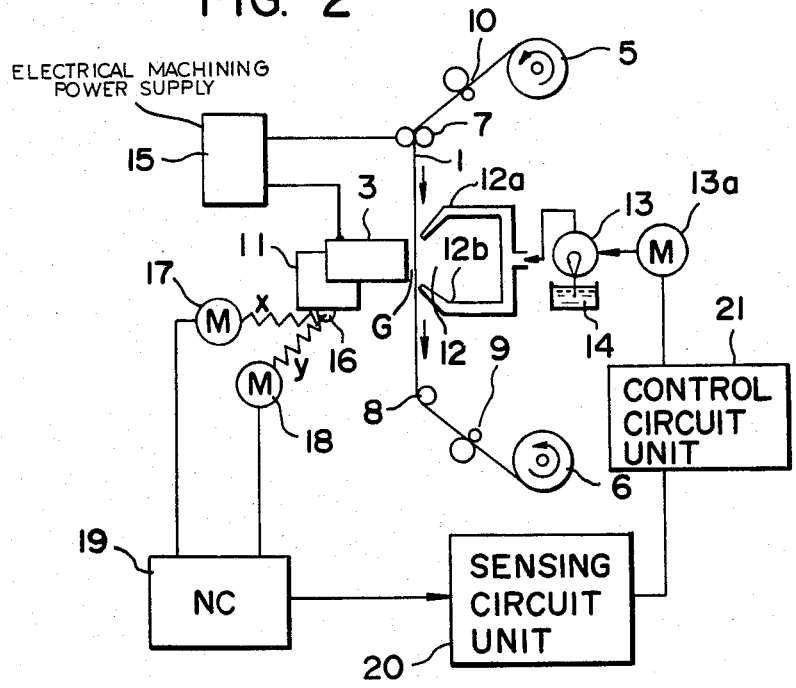
FIG. 2 is a schematic view diagrammatically illustrating a wire-cut EDM apparatus embodying the principles of the present invention.

Referring now to FIG. 2, which illustrates a certain embodiment of the present invention, a wire electrode 1 composed of, say, copper or brass and having a thickness ranging between 0.05 and 0.5 mm is shown fed from a supply reel 5 and wound on a takeup reel 6 while being supported and guided by a pair of support and guide units 7 and 8. The axial displacement of the wire electrode 1 is effected by means of a traction motor drive arrangement 9 provided downstream of the guide member 8, with a braking motor drive 10 being provided upstream of the guide member 7 to cause the wire 1 to travel under a controlled tension between the members 7 and 8 and through the machining gap G formed between the vertically traveling wire electrode 1 and a workpiece 3 juxtaposed therewith and carried on a worktable 11 to be movable in a horizontal plane.

A machining liquid supply unit 12 is shown as being constituted by a pair of nozzles 12a and 12b disposed on the upper and lower sides of the workpiece 3, respectively, to direct downwards and upwards into the machining gap G streams of the machining liquid supplied under pressure by a pump 13 from a reservoir 14. The pump 13 has a rotor driven by a DC motor 13a which is in turn controlledly driven as will be described. The machining liquid is commonly a distilled water liquid having a specific resistance ranging between $10^3$ and $10^5$ ohm-cm.

The wire electrode 1 and the workpiece 3 are energized by a power supply 15 for applying a succession of electrical pulses across the machining gap G flooded with the machining liquid to create time-spaced electrical discharges therethrough, thereby electroerosively removing material from the workpiece 3.

The worktable 11 on which the workpiece 3 is securely mounted is carried on a cross-table arrangement 16 which is driven by a first motor 17, e.g. stepping motor, for displacing the worktable 11 along an x-axis and a second motor 18, e.g. stepping motor, for displacing the worktable 11 along a y-axis orthogonal to the x-axis, the two motors being driven by electrical signals furnished from a numerical-control (NC) unit 19 to displace the workpiece 3 relative to the traveling-wire electrode 1 along a programmed cutting path 4 (FIG. 1).

The NC unit 19 has a magnetic tape or any other recording medium on which the information preprogrammed for the cutting path 4 (FIG. 1) is stored. A suitable reproduction means is provided to read out the information and to regenerate feed signals which are applied to pulse distribution circuits designated to distribute clock pulses from a time base into x- and y-component drive pulses and to apply them to the stepping motors 17 and 18, respectively, whereby to displace the workpiece 3 so that the axis 1a of the wire electrode 1 effectively moves along the desired cutting path 4.

In accordance with the principles of the present invention there is provided a sensing circuit unit 20 for detecting the local shape of the wire-cutting path 4, and a control circuit unit 21 responsive to the sensing circuit unit 20 for controlling the pump 13, thereby controlling the rate of delivery of the machining liquid into the machining gap G as a function of the shape of the wire-cutting path 4.

Figure 3:
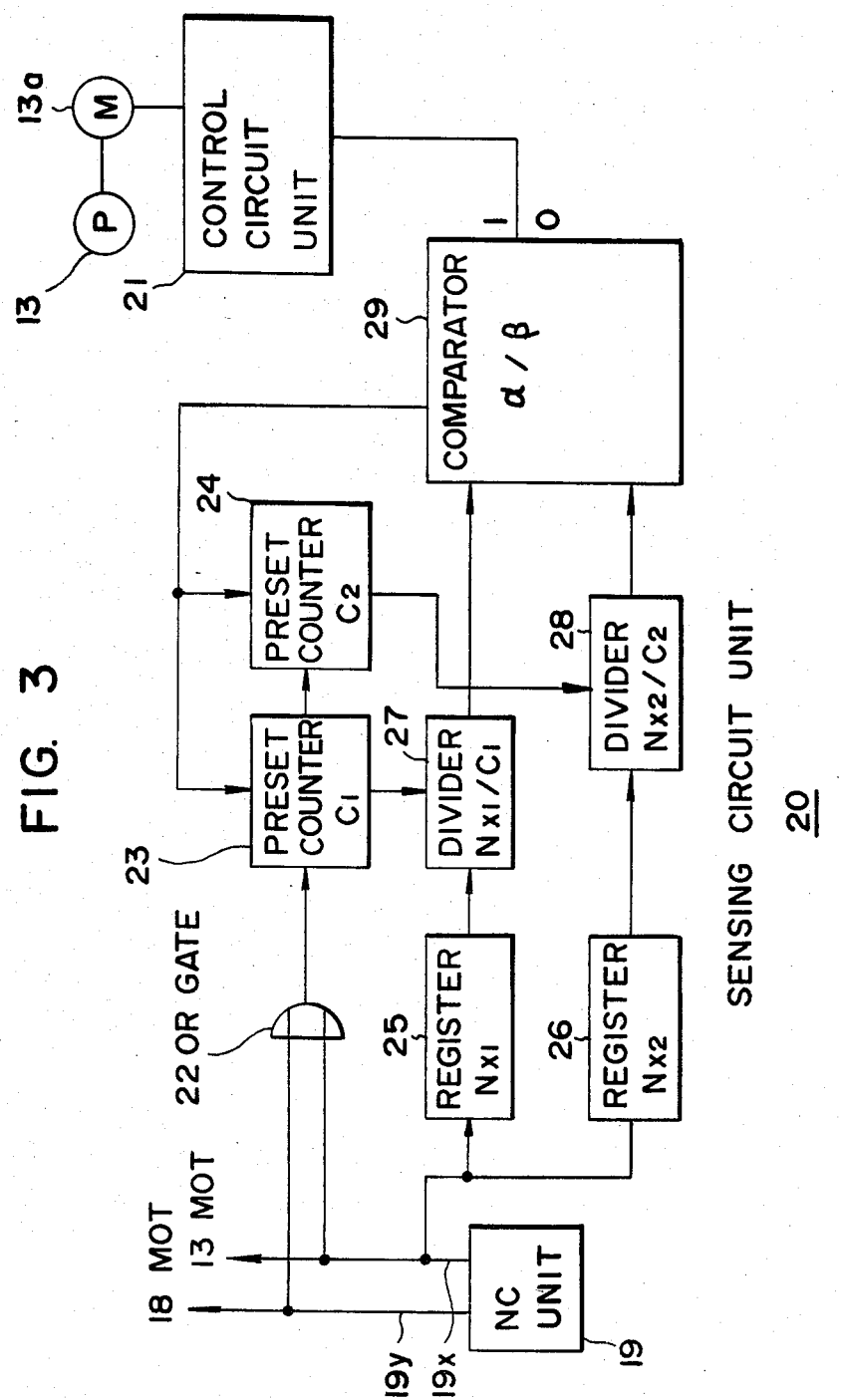
FIG. 3 is a schematic view diagrammatically illustrating portions of the elements shown in FIG. 2, including the sensing circuit unit.

Referring to FIG. 3, the sensing circuit unit 20 includes on OR gate 22 having inputs connected to the x-component drive pulse output 19x and y-component drive pulse output 19y of the NC unit 19 for converting the distributed x-component drive pulses and y-component drive pulses into a uniform train of pulses which are counted by two preset counters 23 and 24, the counter 23 counting overflow counts from the counter 24. Further counters (registers) 25 and 26 having their inputs both connected to the x-component drive pulse output 19x have their outputs connected to dividers 27 and 28, respectively. The divider 27 is used to compare a number Nx1 of x-component drive pulses x1 counted by the counter 25 with the preset count C1 of the counter 23 to provide an output signal representing $Nx1/C1=\alpha$, and the divider 28 is used to compare a number Nx2 of x-component drive pulses x2 counted by the counter 26 with the preset count C2 of the counter 24 to provide an output signal representing $Nx2/C2=\beta$. A comparator 29 constituted by a coincident circuit is connected to the outputs of the dividers 27 and 28 to compare the values $\alpha$ and $\beta$. The comparator 29 provides a "1" output signal when $\alpha=\beta$ and an "0" output signal when $\alpha\neq\beta$. The binary output signals of the comparator 29 is fed to the control circuit 21 which in turn thereby controls the operation of the motor 13a for the pump 13. Then the counters 23, 24, 25 and 26 are cleared and recommence counting.

Figure 4:
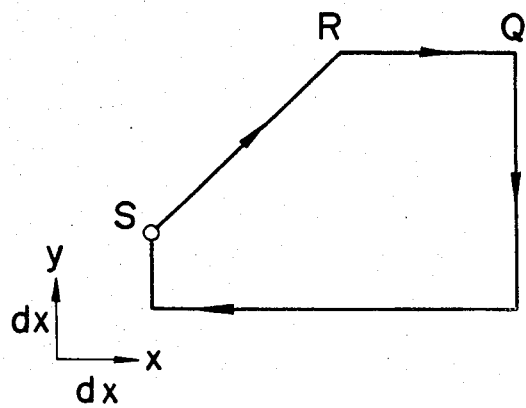
FIG. 4 is a schematic illustration of a wire-cut electrical-contour-machining path having various turning points therein.

Let it be assumed that the wire-cutting EDM operation is to proceed along a cutting path 40 as shown in FIG. 4, the path having a start point S. In the initial section, the axis 1a of the wire electrode 1 is displaced (relative to the workpiece 3) along a rectilinear path SR under the command of the numerical controller 19 distributing drive pulses into x-axis and y-axis components accordingly. At point R, the path is caused to turn and then becomes rectilinear when the region of point Q is reached. In the successive displacements, the axis of the wire electrode 1 is stepped to move dx, −dx, dy or −dy per one increment drive pulse. In the section SR, the ratio $\Sigma dx/\Sigma(dx+dy)$ is always constant because the path is rectilinear. All of the drive pulses furnished to the motors 17 and 18 from the NC unit 19 are applied through the OR gate 22 to the counters 23 and 24 for counting thereby. The x-component drive pulses furnished to the motor 17 are counted by the counters 25 and 26. The counter 23 counts a total number C1 of x- and y-component drive pulses until the N1-th pulse and the counter 25 counts a total number Nx1 of x-component drive pulses. The counter 24 counts a total number C2 of x- and y-component drive pulses until the N2-th pulse and the counter 26 counts a total number C2 of x-component drive pulses (N2>N1, C2>C1). In the section SR, the ratio $Nx1/C1=\alpha$ is equal to $Nx2/C2=\beta$. The comparator 29 then furnishes the "1" output which permits the control circuit 21 to operate the motor 13 so that the machining liquid is delivered into the machining gap G at a predetermined lowest flow rate.

In the region of turning point R, the ratio $\Sigma dx/\Sigma(dx+dy)$ changes. Specifically, the number of dy diminishes and eventually becomes nil to cause the proportion of $\Sigma dx$ of $\Sigma(dx+dy)$ to increases. Since $\beta$ thus deviates from $\alpha$, the comparator 29 now furnishes "0" output which is applied to the control circuit 21 to operate the pump 13 so that the machining liquid is delivered into the machining gap G at a predetermined greater flow rate.

After passage over turning point R, the cutting path becomes again rectilinear until the region of turning point Q is reached. In this section in which the path is in parallel with the y-xis, $\Sigma dy=O$, $C1=Nx1$ and $C2=Nx2$ so that $\alpha=\beta$. The comparator 29 then furnishes again the "1" output signal which is applied to the control circuit 21 to operate the pump 13 so that the rate of delivery of the machining liquid into the machining gap G is resumed to the predetermined lower rate. When the path approaches point Q, the pump 13 is controlled to again increase the rate of the machining liquid delivery into the gap to the greater value.

EXAMPLE

A workpiece composed of SKD 11 (Japanese Industrial standard) steel and having a thickness of 100 mm is electroerosively machined with a copper wire electrode of a thickness of 0.2 mm and using a water machining liquid having a specific resistance of $5\times 10^4$ ohm-cm which is fed through upper and lower nozzles (12a and 12b in FIG. 2) into the machining gap at a volume flow rate of 4 liters/min. The workpiece is fed at a rate of 0.66 mm/min relative to the wire electrode driven to axially travel at a rate of travel of 4 meters/min. It has been found that the wire is broken at a site on the workpiece which is 0.3 mm away from a turning point. When the machining liquid is supplied into the machining gap at an increased rate of flow of 7 liters/min selectively when the wire passes through the turning point, it has been found that no wire breakage takes place.

What is claimed is:

1. A method of electrical-machining an electrically conductive workpiece, comprising the steps of:
axially transporting a continuous wire-electrode from a supply side to a takeup side to cause the wire electrode to continuously traverse the workpiece while defining a machining gap therewith supplied with a machining liquid;
passing an electrical machining current through the liquid flooded machining gap between the traveling wire electrode and the workpiece to electroerosively remove material from the latter;
relatively displacing the workpiece and the traveling wire electrode transversely to the axis of the wire electrode along a programmed cutting path of a predetermined shape corresponding to a desired contour to be formed in the workpiece; and
varying the rate of supply of said machining liquid into sad machining gap as a function of the shape of said programmed cutting path, said programmed cutting path including successive sections intersecting at an angle and said supply rate is increased selectively in a region of said intersection
at least immediately prior to arrival of the axis of said wire electrode at a turning point defining said intersection.

2. A method of electrical-machining an electrically conductive workpiece, comprising the steps of:
axially transporting a continuous wire-electrode from a supply side to a takeup side to cause the wire electrode to continuously traverse the workpiece while defining a machining gap therewith supplied with a machining liquid;

passing an electrical machining current through the liquid flooded machining gap between the traveling wire electrode and the workpiece to electroerosively remove material from the latter;

relatively displacing the workpiece and the traveling wire electrode transversely to the axis of the wire electrode along a programmed cutting path of a predetermined shape corresponding to a desired contour to be formed in the workpiece; and varying the rate of supply of said machining liquid into said machining gap as a function of the shape of said programmed cutting path, said programmed cutting path including successive sections intersecting at an angle and said supply rate is increased selectively in a region of said intersection at least immediately subsequent to passage by the axis of said wire electrode through a turning point defining said intersection.

3. A method of electrical-machining an electrically conductive workpiece, comprising the steps of:

axially transporting a continuous wire-electrode from a supply side to a takeup side to cause the wire electrode to continuously traverse the workpiece while defining a machining gap therewith supplied with a machining liquid;

passing an electrical machining current through the liquid flooded machining gap between the traveling wire electrode and the workpiece to electroerosively remove material from the latter;

relatively displacing the workpiece and the traveling wire electrode transversely to the axis of the wire electrode along a programmed cutting path of a predetermined shape corresponding to a desired contour to be formed in the workpiece; and varying the rate of supply of said machining liquid into said machining gap as a function of the shape of said programmed cutting path, said supply rate being varied as a function of the curvature of said programmed cutting path, the instantaneous curvature of said programmed cutting path being sensed and then said supply rate being varied in response to said sensed curvature.

4. The method defined in claim 3 wherein said supply rate is increased in response to said sensed curvature exceeding a predetermined value.

5. A method of electrical-machining an electrically conductive workpiece, comprising the steps of:

axially transporting a continuous wire-electrode from a supply side to a takeup side to cause the wire electrode to continuously traverse the workpiece while defining a machining gap therewith supplied with a machining liquid;

passing an electrical machining current through the liquid flooded machining gap between the traveling wire electrode and the workpiece to electroerosively remove material from the latter;

relatively displacing the workpiece and the traveling wire electrode transversely to the axis of the wire electrode along a programmed cutting path of a predetermined shape corresponding to a desired contour to be formed in the workpiece; and varying the rate of supply of said machining liquid into said machining gap as a function of the shape of said programmed cutting path, said machining liquid being supplied from a reservoir by a pump having a rotor driven by a motor and said supply rate is varied by varying the rate of rotation of said motor, the instantaneous curvature of said programmed path being sensed and the rate of said rotation of said motor being then varied in response to the sensed curvature.

6. An apparatus for electrical-machining an electrically conductive workpiece with a continuous wire electrode axially transported continuously from a supply side to a takeup side while continuously traversing the workpiece and defining a machining gap between the traveling wire electrode and the workpiece, the apparatus comprising:

means for supplying a machining liquid into said gap;

power supply means for passing an electrical machining current between the workpiece and the wire electrode through the liquid flooded machining gap to electroerosively remove material from the workpiece;

machining feed means for relatively displacing the workpiece and the wire electrode transversely to the axis of the wire electrode along a programmed cutting path of a predetermined shape corresponding to a desired contour to be formed in the workpiece; and means for controlling the rate of supply of said machining liquid into said machining gap as a function of the shape of said programmed cutting path, the last-mentioned means including sensing means operatively associated with said machining feed means for providing a sensing signal representing the shape of said programmed cutting path to act on said control means for controlling said supply rate.

7. The apparatus defined in claim 6 wherein said control means is operable responsive selectively to said sensing signal indicating arrival by the axis of said wire electrode in a region of intersection of two successive sections in said programmed cutting path.

8. The apparatus defined in claim 6 wherein said control means is operable responsive selectively to said sensing signal indicating passage by the axis of said wire electrode thorugh a region of intersection of two successive section in said programmed cutting path.

9. The apparatus defined in claim 7 or claim 8 wherein said control means is operable responsive to said sensing signal for increasing said supply rate.

10. The apparatus defined in claim 6 wherein said control means include a pump having a rotor for drawing said machining liquid into said machining gap from a reservoir, a motor for driving said rotor and a driver circuit for said motor, said driver circuit being responsive to said sensing means for increasing the rate of rotation of said motor selectively in response to said sensing signal for varying said supply rate.

11. The apparatus defined in claim 10 wherein said sensing means is operable responsive to arrival by the axis of said wire electrode and the region of a turning point in said path to produce said sensing signal.

12. The apparatus defined in claim 10 wherein said sensing means is operable responsive to passage by the axis of said wire electrode immediately out of a turning point on said path to produce said sensing signal.

* * * * *